UNITED STATES PATENT OFFICE.

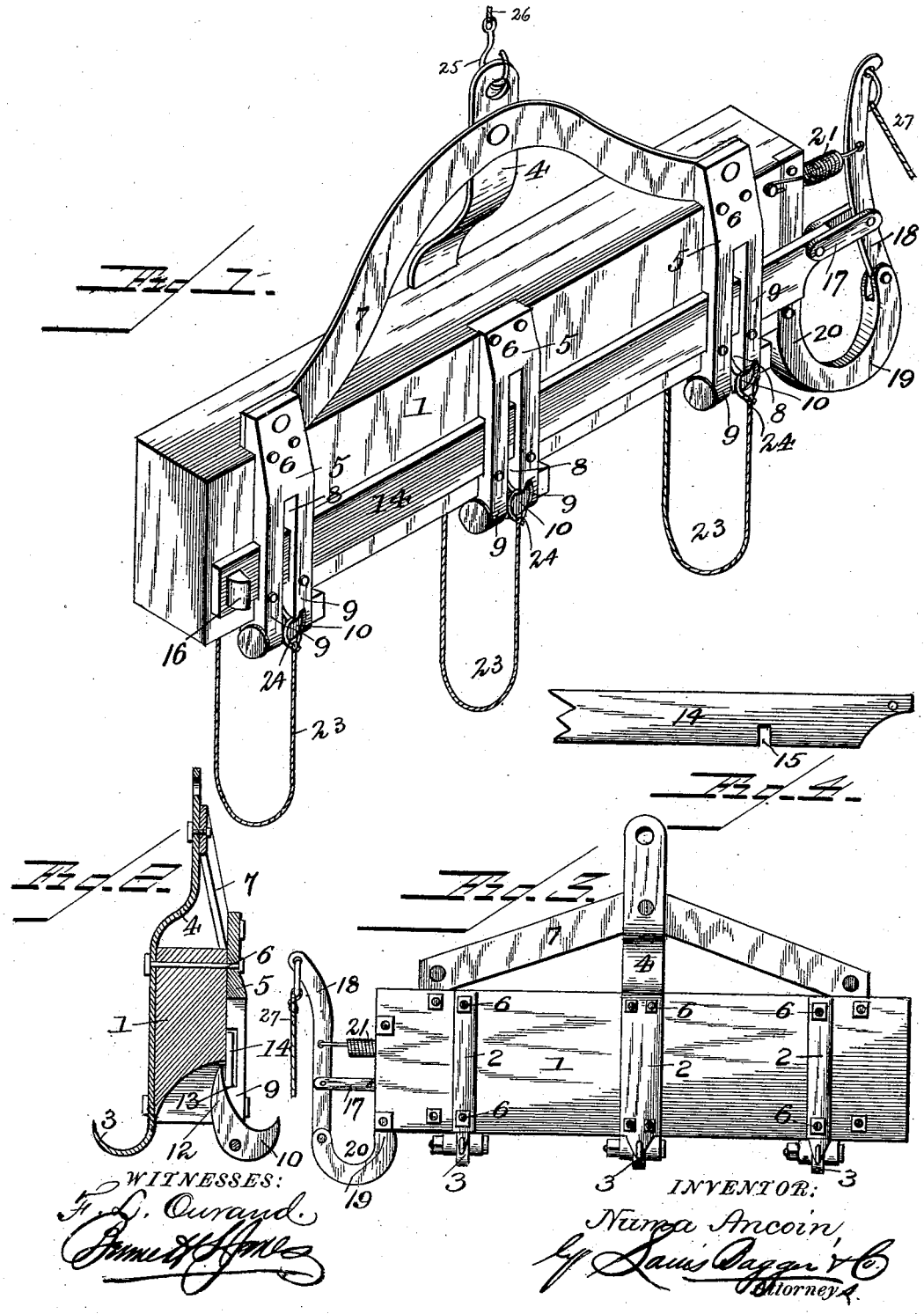

NUMA ANCOIN, OF DELCAMBRE, LOUISIANA, ASSIGNOR OF ONE-HALF TO FELIX RICHARD, OF SAME PLACE.

SLING FOR UNLOADING SUGAR-CANE.

SPECIFICATION forming part of Letters Patent No. 543,666, dated July 30, 1895.

Application filed February 20, 1895. Serial No. 539,053. (No model.)

*To all whom it may concern:*

Be it known that I, NUMA ANCOIN, a citizen of the United States, and a resident of Delcambre, in the parish of Iberia and State of Louisiana, have invented certain new and useful Improvements in Slings for Unloading Sugar-Cane; and I do hereby declare that the following is a full, clear, and exact description of the invention, which will enable others skilled in the art to which it appertains to make and use the same, reference being had to the accompanying drawings, which form a part of this specification.

My invention relates to improvements in slings for unloading cane and other material from wagons and depositing it in a railway-car for transportation; and the object of the invention is to produce a novel construction of sling for such purpose which shall possess superior advantages with respect to efficiency in operation.

In the accompanying drawings, Figure 1 is a perspective view of a sling constructed in accordance with my invention. Fig. 2 is a transverse sectional view taken through the hoisting-beam which carries the ropes and the hoisting devices for attaching and detaching the same. Fig. 3 is a rear elevation of the hoisting-beam. Fig. 4 is an elevation showing a portion of the horizontally-movable bar.

In the said drawings the reference-numeral 1 designates a rectangular beam, provided on one side with a series of plates 2, formed at the lower side with hooks 3, which are stationary, and with which one end of each of the ropes hereinafter described is connected. The central one of these plates 2 is somewhat broader than the end plates, and is formed with an upward extension 4, having an eye for the engagement of the hook on the end of a hoisting-rope. Upon the opposite or front side this beam is provided with three plates 5, which are held in by bolts 6, which also serve to secure the plates 2 to the beam. To the upper ends of the end plates 5 is secured an arm 7, also secured to the extension 4. Each of the said plates 5 is formed with a vertical slot 8, forming two arms 9, in the lower ends of which is pivoted a hook 10, having a tapered shank 12. The inner faces of the said plates are formed with aligned grooves 13, forming guideways for a horizontally-movable bar 14, provided with a slot 15, one for each of the hooks. One end of this bar is provided with a stop 16, while the other end is pivoted to a link 17, also pivotally connected with a lever 18, the lower end of which is pivoted to the curved end 19 of a bar 20, secured to one end of the beam. A coiled spring 21 is connected with said lever and plate.

The operation is as follows: Ropes 23, having loops 24 at each end, are placed in a wagon, extending transversely across the same. The wagon is then driven through the field and the cut cane is placed upon the ropes. When a sufficient load has been gathered the wagon is driven to the railroad station or to the car which is to receive the cane and transport it to the mill. One end of each of the ropes is then connected with the stationary hooks, while the other ends are connected with the pivoted hooks, the shanks 12 of the hooks bearing against the solid portions of the bar 14 and preventing the hooks from turning. A hook 25 on the end of a hoisting-rope 26 is then connected with the extension 4, which rope is connected with a windlass on a crane, (not shown,) or with any other hoisting mechanism. Said rope is then elevated, carrying with it the sling and cane, which, when removed from the wagon, is swung over a car. The lever 18 is then operated by a rope 27, which will move the bar 14 laterally, and the slots 15 registering with the shank 12 of the hooks will allow the hooks to be turned by the weight of the load and the load to be dumped into the car. When the lever is released the coiled spring will return the bar to normal, and when the ropes are again engaged with the hooks the shanks will again bear against the solid portion of the bar. The beam just in rear of said hooks is formed with a beveled recess 25 to allow the hooks room to turn in.

While I have shown three hooks, it is obvious that more or less may be employed, and that the device may be employed for unloading any other material besides cane to which it is applicable.

Having thus fully described my invention, what I claim is—

The combination with the beam, the plates secured to one side thereof provided with stationary hooks, the plates secured to the other side formed with vertical slots and aligned horizontal grooves, and the pivoted hooks formed with shanks, of the horizontally movable bar working in said grooves, and having a series of slots at the lower edge, the link, the lever and the coiled spring, substantially as described.

In testimony that I claim the foregoing as my own I have hereunto affixed my signature in presence of two witnesses.

NUMA ANCOIN.

Witnesses:
ZURON DECUIR,
JAMES A. BARBARIN.